(12) United States Patent
Fujisawa (10) Patent No.: US 11,247,288 B2
(45) Date of Patent: Feb. 15, 2022

(54) WELDING POSITION DETECTION DEVICE, WELDING POSITION DETECTION METHOD, AND WELDING ROBOT SYSTEM

(71) Applicant: DAIHEN Corporation, Osaka (JP)

(72) Inventor: Sho Fujisawa, Osaka (JP)

(73) Assignee: Daihen Corporation, Osaka (JP)

(*) Notice: Subject to any disclaimer, the term of this patent is extended or adjusted under 35 U.S.C. 154(b) by 494 days.

(21) Appl. No.: 16/223,368

(22) Filed: Dec. 18, 2018

(65) Prior Publication Data

US 2019/0184481 A1   Jun. 20, 2019

(30) Foreign Application Priority Data

Dec. 19, 2017 (JP) .............................. JP2017-242660

(51) Int. Cl.
| | |
|---|---|
| *B23K 9/09* | (2006.01) |
| *B23K 9/095* | (2006.01) |
| *B25J 13/08* | (2006.01) |
| *B25J 15/00* | (2006.01) |
| *B23K 9/127* | (2006.01) |

(52) U.S. Cl.
CPC .......... *B23K 9/0953* (2013.01); *B23K 9/0956* (2013.01); *B23K 9/1274* (2013.01); *B25J 13/088* (2013.01); *B25J 15/0019* (2013.01)

(58) Field of Classification Search
CPC .. B23K 9/0953; B23K 9/0956; B23K 9/1274; B23K 9/127; B25J 13/088; B25J 15/0019; G05B 19/418; G05B 19/04; G05B 19/00; G05B 2219/37009
See application file for complete search history.

(56) References Cited

U.S. PATENT DOCUMENTS

| | | | | | |
|---|---|---|---|---|---|
| 5,511,007 | A | * | 4/1996 | Nihei ..................... | B23K 9/127 |
| | | | | | 700/177 |
| 5,887,122 | A | * | 3/1999 | Terawaki ............. | B23K 9/1274 |
| | | | | | 700/258 |
| 10,152,034 | B2 | * | 12/2018 | Komatsu ............ | G05B 13/0265 |

(Continued)

FOREIGN PATENT DOCUMENTS

| | | |
|---|---|---|
| CN | 103759648 | 4/2014 |
| JP | 11000883 | 1/1999 |

(Continued)

*Primary Examiner* — Brian W Jennison
(74) *Attorney, Agent, or Firm* — Sterne, Kessler, Goldstein & Fox, P.L.L.C.

(57) ABSTRACT

Provided is a welding position detection device capable of improving the welding position detection accuracy. The welding position detection device includes a calculation unit that irradiates two members to be joined with laser light to calculate approximate straight lines of the respective members, calculates an end portion of one member of the two members on the basis of the approximate straight line of the one member, and calculates a virtual straight line which is a straight line connecting the calculated end portion of the one member and the approximate straight line of the other member of the two members and having a specific angle with respect to the approximate straight line of the one member, and a detection unit that detects an intersection point of the calculated virtual straight line and the approximate straight line of the other member as a welding position.

9 Claims, 5 Drawing Sheets

(56) References Cited

U.S. PATENT DOCUMENTS

2010/0161125 A1* 6/2010 Aoba ..................... G06T 1/00
                                                        700/254
2016/0121480 A1* 5/2016 Okahisa ................ B25J 9/1643
                                                        700/245

FOREIGN PATENT DOCUMENTS

| JP | 2001062566 A | 3/2001 |
| JP | 2009-075136 A | 4/2009 |
| WO | WO 9946771 A1 | 9/1999 |

* cited by examiner

WELDING POSITION DETECTION DEVICE, WELDING POSITION DETECTION METHOD, AND WELDING ROBOT SYSTEM

CROSS-REFERENCES TO RELATED APPLICATIONS

This application relates to and claims priority from Japanese Patent Application No. 2017-242660, filed on Dec. 19, 2017, the entire disclosure of which is incorporated herein by reference.

BACKGROUND

Field

The present invention relates to a welding position detection device, a welding position detection method, and a welding robot system.

Description of Related Art

A welding robot that performs arc welding generally moves a welding torch along a welding line position preset by teaching and welds workpieces which are objects to be joined. In the case of performing welding by a welding robot, for example, due to an assembling error of a workpiece to be welded, a deformation of a workpiece due to heat during welding, and the like, a displacement occurs between the welding line position which has been set for the welding robot and the welding position of the workpiece which is to be welded therefrom. In order to correct such positional displacement, Patent Publication JP-A-2001-62566 discloses a device that detects a welding position of a required portion by using a laser sensor and corrects a welding line position during welding by a welding robot.

In Patent Publication JP-A-2001-62566, when a welding position is detected using the laser sensor, a cross-sectional shape pattern of two members forming a joint is acquired and the intersection point of two straight lines specified by the two cross-sectional shape patterns is detected as the welding position.

SUMMARY

Figure 5:
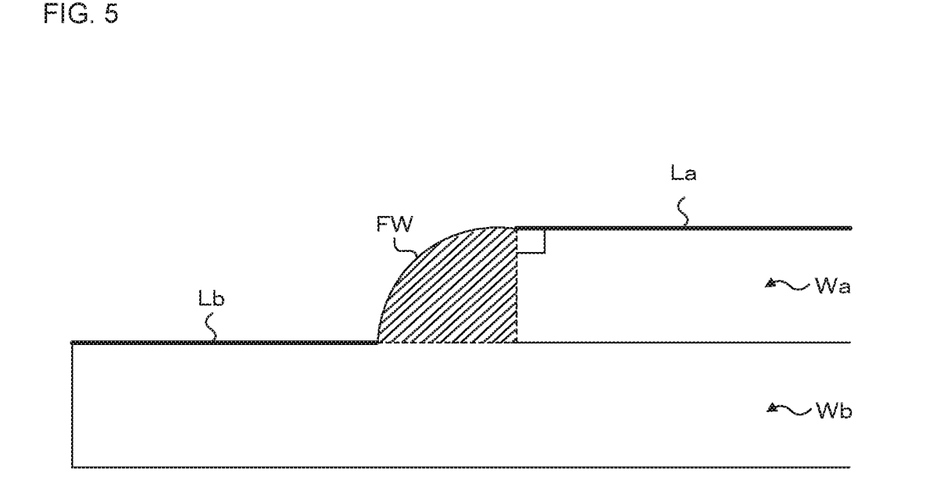
FIG. 5 is a schematic diagram for explaining a conventional method of detecting a welding position.

Meanwhile, in Patent Publication JP-A-2001-62566, when detecting the welding position of a required portion, it is necessary that two straight lines specified by the cross-sectional shape pattern of the two workpieces intersect. However, in some cases, for example, as shown in FIG. 5, in the portion FW tack-welded to the lap joint by fillet welding, two straight lines La and Lb specified by the cross-sectional shape pattern of two workpieces Wa and Wb are substantially parallel and do not intersect. In such a case, it is impossible to detect the welding position suitable for the objects to be joined, and welding may be performed according to the erroneous position of the welding line.

Accordingly, it is an object of the present invention to provide a welding position detection device, a welding position detection method, and a welding robot system capable of improving the welding position detection accuracy.

A welding position detection device according to one aspect of the present invention includes a first calculation unit that irradiates two members to be joined with laser light to calculate approximate straight lines of the respective members; a second calculation unit that calculates an end portion of one member of the two members on the basis of the approximate straight line of the one member; a third calculation unit that calculates a virtual straight line which is a straight line connecting the calculated end portion of the one member and the approximate straight line of the other member of the two members and having a specific angle with respect to the approximate straight line of the one member; and a detection unit that detects an intersection point of the calculated virtual straight line and the approximate straight line of the other member as a welding position.

According to this aspect, it is possible to irradiate two members to be joined with laser light to calculate approximate straight lines of the respective members, calculate an end portion of one member of the two members on the basis of the approximate straight line of the one member, calculate a virtual straight line which is a straight line connecting the calculated end portion and the approximate straight line of the other member and having a specific angle with respect to the approximate straight line of the one member, and detect an intersection point of the calculated virtual straight line and the approximate straight line of the other member as a welding position. As a result, even when the two approximate straight lines do not intersect, since the intersection point of the virtual straight line extending from the end portion of the one member and the approximate straight line of the other member can be detected as the welding position, it is possible to detect a welding position suitable for the objects to be joined.

In the above aspect, there may be further provided a fourth calculation unit that radiates laser light from the end portion of the one member toward the other member side in a direction forming a specific angle with the approximate straight line of the one member and calculates a second approximate straight line in the one member, and the third calculation unit may calculate the virtual line when the second approximate straight line has a length less than a predetermined prescribed length. As a result, for example, at a site tacked by fillet welding, the second approximate straight line may have a length less than the prescribed length, but the detection accuracy of the intersection point can be improved by calculating the intersection point by using a virtual straight line connecting the end portion of the one member and the approximate straight line of the other member at a specific angle that can be set according to the shape of the one member, as compared with the detection accuracy obtained by calculating the intersection point on the basis of the second approximate straight line, which has a small length, at such a site.

In the above aspect, the prescribed length may be equal to or less than the thickness of the one member. As a result, it is possible to specify the site for calculating the intersection point by using the virtual straight line as a tacking site where the length of the second approximate straight line becomes less than the thickness of the one member, or the like.

In the above aspect, when the second approximate straight line is not less than the predetermined prescribed length, the detection unit may detect an intersection point of the second approximate straight line and the approximate straight line of the other member as a welding position. As a result, when the second approximate straight line has a length equal to or larger than the prescribed length, it is possible to detect the intersection point with the highly accurate second approximate straight line calculated using the laser sensor.

In the above aspect, there may be further provided an estimation unit that, when the second calculation unit does not calculate the end portion of one member within a predetermined end portion detection range, estimates a welding position by calculating a present intersection point on the basis of a plurality of intersection points detected by the detection unit in a previous detection cycle and therebefore, instead of detecting the intersection point by the detection unit. As a result, an error of the intersection point caused by the positional displacement of the end portion calculated, for example, when the end portion is buried by tacking, when the end portion is melted, or the like can be prevented from being reflected in the welding position.

In the above aspect, the two members may be welded by a lap joint. As a result, a welding position suitable for objects to be joined can be detected even when welding is performed by a lap joint in which approximate straight lines of the two members do not intersect.

In the above aspect, a part of the lap joint may be tacked by fillet welding. As a result, the welding position suitable for the objects to be joined can be detected even when tacking is performed by fillet welding and the approximate straight lines of the two members do not intersect.

In the above aspect, the specific angle may be substantially a right angle. As a result, a welding position suitable for the objects to be joined can be detected, for example, even at a site welded by a lap joint and tacked by fillet welding.

A welding position detection method according to another aspect of the present invention is controlled by a processor, the method comprising: a first calculation step of irradiating two members to be joined with laser light and calculating approximate straight lines of the respective members; a second calculation step of calculating an end portion of one member of the two members on the basis of the approximate straight line of the one member; a third calculation step of calculating a virtual straight line which is a straight line connecting the calculated end portion of the one member and the approximate straight line of the other member of the two members and having a specific angle with respect to the approximate straight line of the one member and a detection step of detecting an intersection point of the calculated virtual straight line and the approximate straight line of the other member as a welding position.

According to this aspect, it is possible to irradiate two members to be joined with laser light to calculate approximate straight lines of the respective members, calculate an end portion of one member of the two members on the basis of the approximate straight line of the one member, calculate a virtual straight line which is a straight line connecting the calculated end portion and the approximate straight line of the other member and having a specific angle with respect to the approximate straight line of the one member, and detect an intersection point of the calculated virtual straight line and the approximate straight line of the other member as a welding position. As a result, even when the two approximate straight lines do not intersect, since the intersection point of the virtual straight line extending from the end portion of the one member and the approximate straight line of the other member can be detected as the welding position, it is possible to detect a welding position suitable for the objects to be joined.

A welding robot system according to another aspect of the present invention includes: a welding robot that performs welding; and a welding position detection device, including a first calculation unit that irradiates two members to be joined with laser light to calculate approximate straight lines of the respective members; a second calculation unit that calculates an end portion of one member of the two members on the basis of the approximate straight line of the one member; a third calculation unit that calculates a virtual straight line which is a straight line connecting the calculated end portion of the one member and the approximate straight line of the other member of the two members and having a specific angle with respect to the approximate straight line of the one member; and a detection unit that detects an intersection point of the calculated virtual straight line and the approximate straight line of the other member as a welding position.

According to this aspect, in a welding robot system having a welding robot, it is possible to irradiate two members to be joined with laser light to calculate approximate straight lines of the respective members, calculate an end portion of one member of the two members on the basis of the approximate straight line of the one member, calculate a virtual straight line which is a straight line connecting the calculated end portion and the approximate straight line of the other member and having a specific angle with respect to the approximate straight line of the one member, and detect an intersection point of the calculated virtual straight line and the approximate straight line of the other member as a welding position. As a result, even when the two approximate straight lines do not intersect, since the intersection point of the virtual straight line extending from the end portion of the one member and the approximate straight line of the other member can be detected as the welding position, it is possible to detect a welding position suitable for the objects to be joined.

In accordance with the present invention, it is possible to provide a welding position detection device, a welding position detection method, and a welding robot system capable of improving the welding position detection accuracy.

DETAILED DESCRIPTION

Preferred embodiments of the present invention will be described with reference to the accompanying drawings. In the drawings, the same reference numerals are given to the same or similar components.

Figure 1:
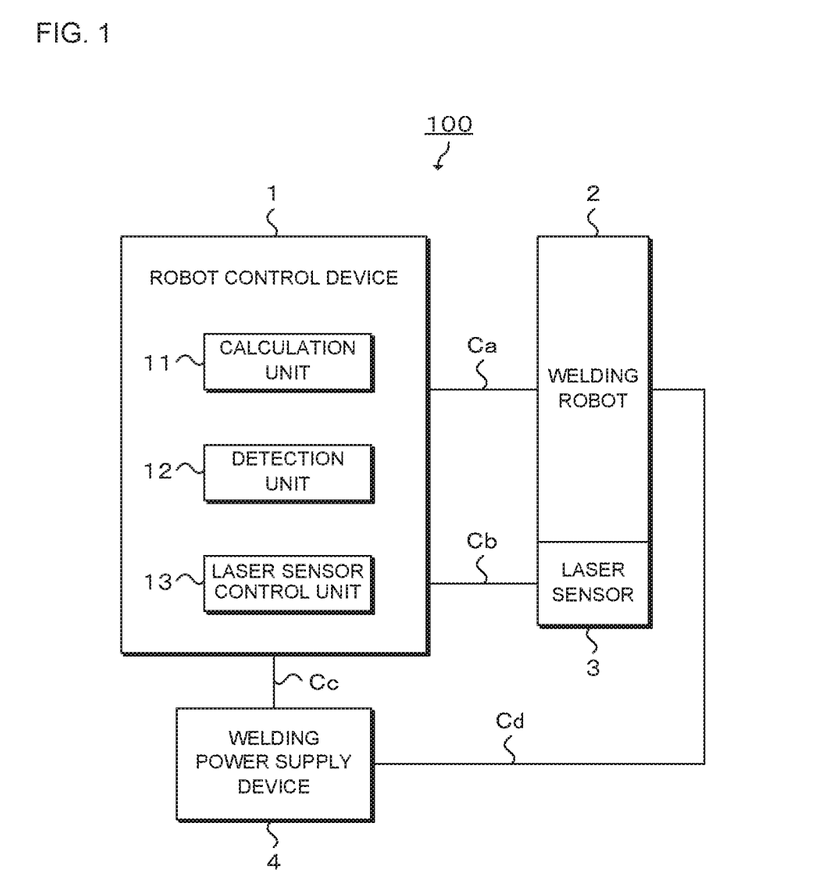
FIG. 1 is a block diagram illustrating a schematic configuration of a welding robot system including a welding position detection device according to the present invention.

FIG. 1 is a block diagram illustrating a schematic configuration of a welding robot system including a welding position detection device according to the present invention. The welding robot system 100 includes, for example, a robot control device 1, a welding robot 2, a laser sensor 3, and a welding power supply device 4. Among these components, the robot control device 1 includes the welding position detection device according to the present invention, the details of which will be described hereinbelow.

The welding robot 2 performs arc welding according to welding implementation conditions held in the robot control device 1, and is also called a manipulator.

Specifically, the welding robot 2 includes an articulated arm provided on a base member fixed to the floor surface of a factory or the like, a welding torch connected to the distal end of the articulated arm, a wire feeder fixed to the articulated arm, and a workbench for installing the workpiece. Welding implementation conditions include, for example, a welding line position, welding conditions, a welding start position, a welding end position, an arc discharge time, a welding distance and a welding torch orientation.

The welding power supply device 4 controls the welding current, welding voltage, wire feeding speed, and the like according to welding implementation conditions held by the robot control device 1. The welding power supply device 4 supplies electric power to the welding torch of the welding robot 2 via the power cable Cd and generates an arc between the distal end of the welding wire and the workpiece.

The robot control device 1 is constituted, for example, by a control unit including a processor, a storage device, a communication device, an input device, a display device, and the like as physical components. The storage device is, for example, a memory, and stores various programs and various types of information necessary for executing processing in the robot control device 1. The communication device is, for example, a communication interface and controls communication with the welding robot 2 connected via a communication cable Ca, communication with the laser sensor 3 connected via a communication cable Cb, and communication with the welding power supply device 4 connected via a communication cable Cc. The input device is, for example, a device having an input key, and accepts an input of teaching data or the like from an operator. The display device, for example, displays characters, images, and the like.

The robot control device 1 may be configured of a single control unit or of a plurality of control units. As an example of the latter configuration, the robot control device 1 is configured of a control device main body, a teach pendant, and a laser sensor control device.

The teach pendant is a control unit by which an operator teaches the operation of the welding robot 2. The control device main body is a control unit that controls the welding robot 2 and the welding power supply device 4 in accordance with instructions from the teach pendant. The laser sensor control device is a control unit that controls radiation of laser light by the laser sensor 3 or the like in accordance with a sensing instruction from the control device main body, and has a function as a laser sensor control unit 13 to be described hereinbelow.

The robot control device 1 realizes various functions by executing with a processor a predetermined program stored in the storage device. The various functions include, for example, functions of the calculation unit 11, the detection unit 12, and the laser sensor control unit 13. Among these various functions, the functions of the calculation unit 11 and the detection unit 12 are functions of the welding position detection device according to the present invention. The calculation unit 11 and the detection unit 12 are not limited to being included in the robot control device 1, and may be included in the above-described laser sensor control device or other devices. In addition, the functions of the robot control device 1 are not limited to the various functions described above, and arbitrary functions can be appropriately added thereto as necessary.

The calculation unit 11 calculates an approximate straight line for each of the two members which are to be joined. For example, the approximate straight line is calculated by the following procedure.

First, the calculation unit 11 transmits a sensing instruction to the laser sensor control unit 13, irradiates the surface of each member with the laser light of the laser sensor 3 while moving the laser light, and detects the reflected light. As a result, it is possible to acquire discrete straight line shape data from the surface of each member. Subsequently, the calculation unit 11 calculates an approximate straight line on the basis of the acquired straight line shape data by, for example, a least squares method.

This will be specifically described with reference to FIGS. 2A to 2D. FIGS. 2A to 2D are schematic diagrams illustrating an example in which a portion FW tacked by fillet welding is present at a welding line position preset by teaching when welding a lower member LM and an upper member UM by a lap joint. Here, the lower side and the upper side are determined with reference to the work table on which the members are placed. For example, among the two members to be joined, the member directly placed on the work table becomes the lower member, and the member placed on the lower member becomes the upper member.

Figure 2A:
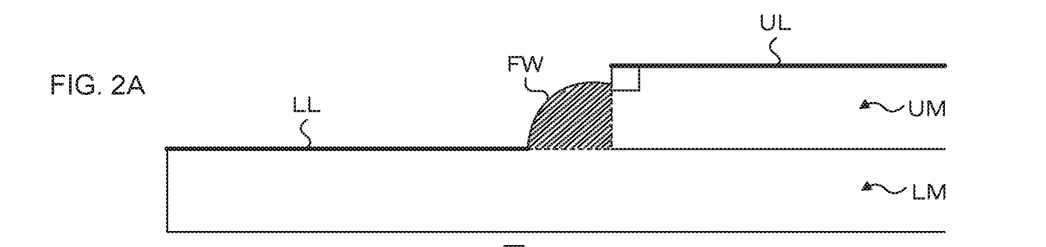
FIGS. 2A to 2D are schematic diagrams for explaining a procedure for detecting a welding position in the welding robot system of FIG. 1.

FIG. 2A indicates that an approximate straight line LL is calculated based on the straight line shape data obtained from the surface of the lower member LM, and an approximate straight line UL is calculated based on the straight line shape data obtained from the surface of the upper member UM.

The calculation unit 11 in FIG. 1 calculates the end portion of one member of the two members on the basis of the approximate straight line of the one member. Which one of the two members to select as the one member can be appropriately determined in consideration of the positional relationship between the two members, the position of the joint, and the like. For example, when the welded joint is a lap joint, the upper member corresponds to the one member, and the lower member corresponds to the other member. In this case, the calculation unit 11 calculates the end of the upper member based of the two members on the basis of the approximate straight line of the upper member.

Figure 2B:
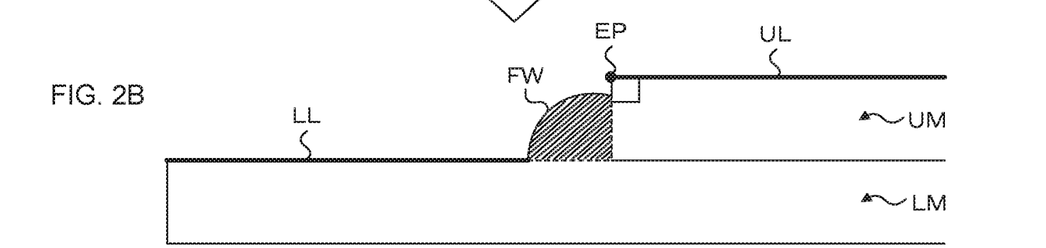

This will be specifically described with reference to FIG. 2B. FIG. 2B indicates that the end portion EP of the upper member UM is calculated based on the approximate straight line UL of the upper member UM. The position of the end portion EP of the upper member UM can be specified based on, for example, a position at which the straight line shape data obtained from the surface of the upper member UM are interrupted, a position at which the straight line shape data deviate from the straight line shape, and the like.

The calculation unit 11 in FIG. 1 transmits a sensing instruction to the laser sensor control unit 13, causes radiation of the laser light of the laser sensor 3 from the end portion of the one member to the other member side in a direction forming a specific angle with respect to the approximate straight line of the one member, while moving the laser light, and detects the reflected light thereof. As a result, it is possible to acquire discrete straight line shape data from the one member toward the other member side. The specific angle is set according to the shape of the one member. Specifically, an internal angle of a member formed at the end portion of the one member is set as the specific angle. For example, when the welded joint is a lap joint, the specific angle is generally substantially a right angle.

Subsequently, the calculation unit 11 calculates an approximate straight line on the basis of the acquired straight line shape data by, for example, a least squares method. In order to distinguish the approximate straight line calculated herein from the approximate straight line UL described above, the former will be also referred to hereinbelow as a "second approximate straight line".

Figure 2C:
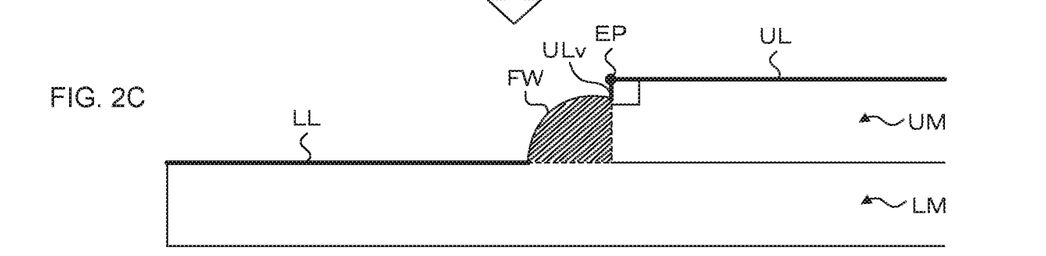

This will be specifically described with reference to FIG. 2C. FIG. 2C indicates that a second approximate straight line ULv extending from the end portion EP of the upper member UM to the lower member LM side is calculated. The end of the second approximate straight line ULv can be specified based on, for example, a position where the straight line shape data obtained from the side surface of the upper member UM deviate from the straight line shape and the like.

The calculation unit 11 in FIG. 1 determines whether or not the second approximate straight line has a length less than a predetermined prescribed length. The prescribed length can be arbitrarily set so as to be equal to or less than the thickness of the one member. When the second approximate straight line has a length less than the prescribed length, the calculation unit 11 calculates a virtual straight line connecting the end portion of the one member and the approximate straight line of the other member.

The virtual straight line is a straight line connecting the end portion of the one member and the approximate straight line of the other member and having the specific angle with respect to the approximate straight line of the one member. For example, when the specific angle is substantially a right angle, the calculation unit 11 calculates a virtual straight line which is a straight line connecting the calculated end portion of the upper member and the approximate straight line of the lower member and having an angle of approximately 90 degrees with respect to the approximate straight line of the upper member.

Figure 2D:
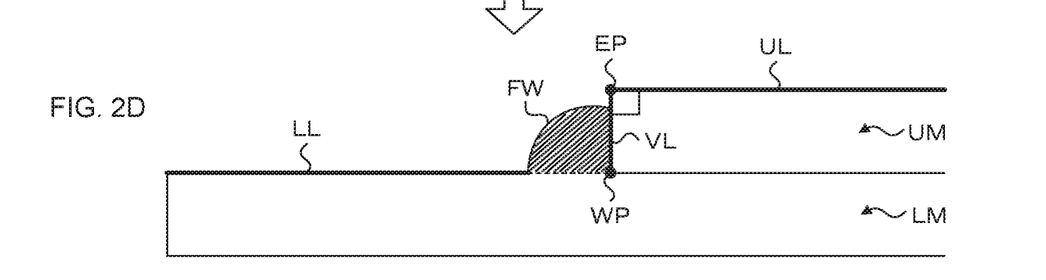

This will be specifically described with reference to FIG. 2D. FIG. 2D indicates that a virtual straight line VL which is a straight line connecting the end portion EP of the upper member UM and the approximate straight line LL of the lower member LM and having an angle of 90 degrees with respect to the approximate straight line UL of the upper member UM is calculated.

The detection unit 12 in FIG. 1 detects the intersection point of the virtual straight line and the approximate straight line of the other member as a welding position and stores the detected intersection point in the memory. FIG. 2D indicates that the intersection point WP of the virtual straight line VL and the approximate straight line LL of the lower member LM is detected as the welding position.

When it is determined that the second approximate straight line has a length which is not less than the prescribed length, the detection unit 12 detects the intersection point of the second approximate straight line and the approximate straight line of the other member as the welding position and stores the detected intersection point in the memory. Here, a specific procedure implemented in the case where it is determined that the second approximate straight line has a length not less than the prescribed length will be described with reference to FIGS. 3A to 3D.

Figure 3A:
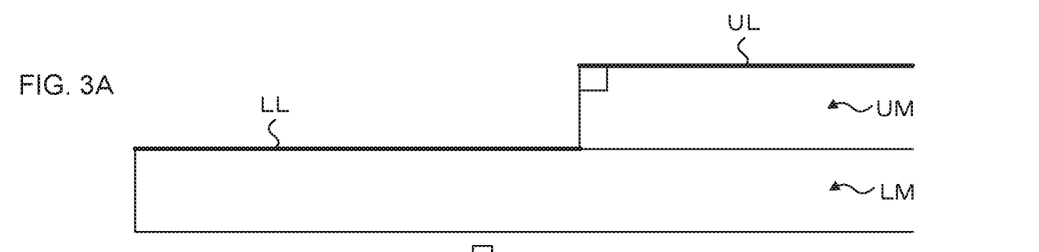
FIGS. 3A to 3D are schematic diagrams for explaining a procedure for detecting a welding position in the welding robot system of FIG. 1.
Figure 3B:
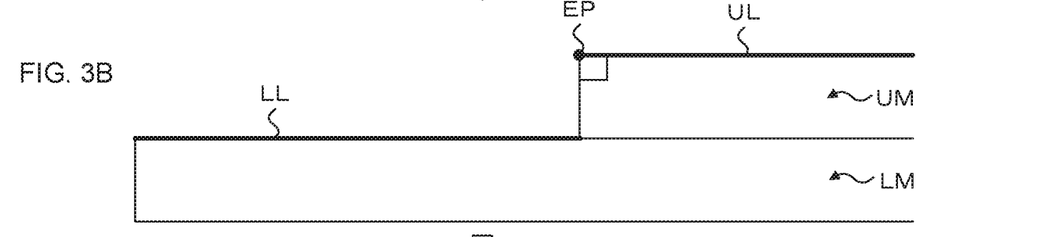

FIG. 3A indicates that the approximate straight line LL is calculated on the basis of the straight line shape data obtained from the surface of the lower member LM, and the approximate straight line UL is calculated on the basis of the straight line shape data obtained from the surface of the upper member UM. FIG. 3B indicates that the end portion EP of the upper member UM is calculated based on the approximate straight line UL of the upper member UM.

Figure 3C:
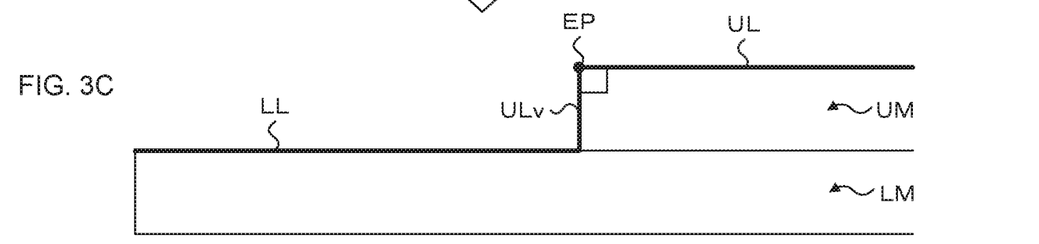
Figure 3D:
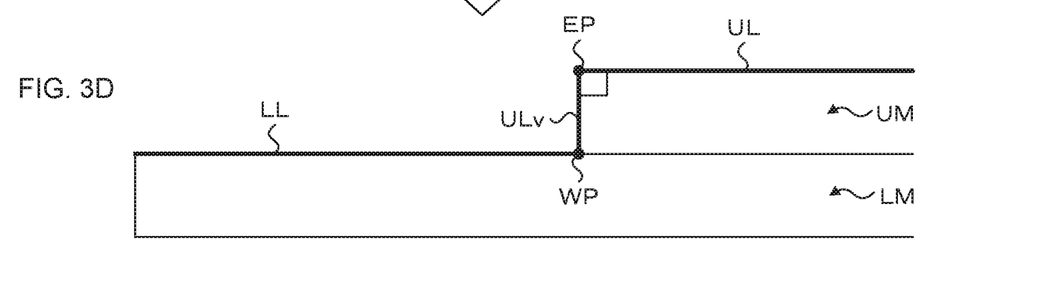

FIG. 3C indicates that the second approximate straight line ULv extending from the end portion EP of the upper member UM to the lower member LM side is calculated. Since the second approximate straight line ULv shown in the same figure has a length equal to the thickness of the upper member UM, the length of the second approximate straight line does not fall less than the prescribed length which has been set to be equal to or less than the thickness of the upper member UM. Therefore, the intersection point of the second approximate straight line ULv and the approximate straight line LL of the lower member LM is detected as the welding position. FIG. 3D indicates that the intersection point WP of the second approximate straight line ULv and the approximate straight line LL of the lower member LM is detected as the welding position.

Here, when the welding position WP detected by the detection unit 12 is different from the welding line position preset by teaching, correction is performed to replace the welding line position preset by teaching with the detected welding position WP. As a result, welding can be performed based on the welding position WP suitable for the objects to be joined.

Figure 4:
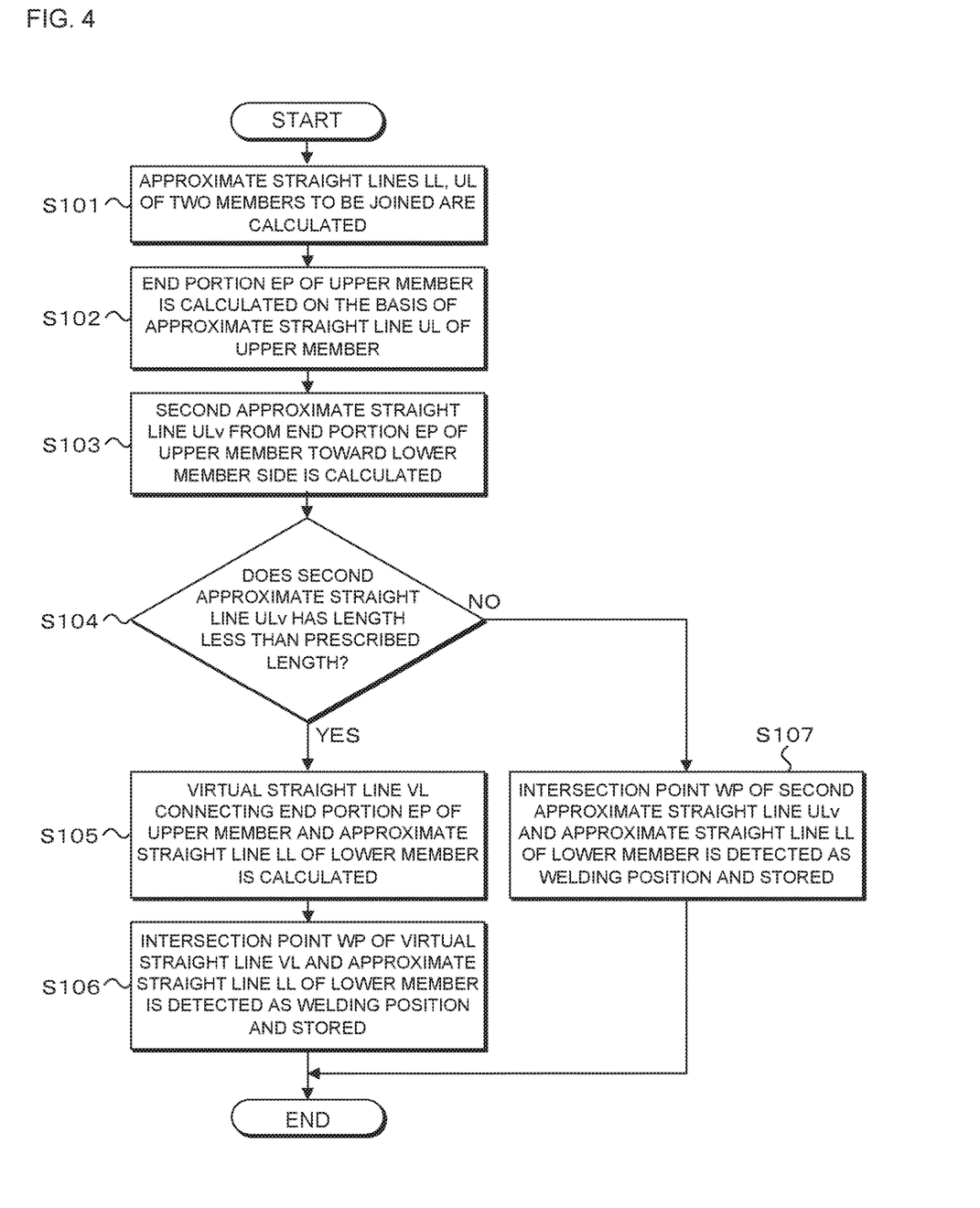
FIG. 4 is a flowchart for explaining an example of an operation of the welding robot system of FIG. 1.

Next, the operation of the robot control device 1 in the embodiment will be described with reference to FIG. 4.

First, the calculation unit 11 transmits a sensing instruction to the laser sensor control unit 13, causes radiation of the laser light on the two members LM and UM which are to be joined, and calculates the approximate straight lines LL and UL of the respective members LM and UM (step S101).

Subsequently, the calculation unit 11 calculates the end portion EP of the upper member UM on the basis of the approximate straight line UL of the upper member UM calculated in step S101 (step S102).

Subsequently, the calculation unit 11 transmits a sensing instruction to the laser sensor control unit 13, causes radiation of the laser light from the end portion EP of the upper member UM toward the lower member LM side in a direction forming an angle of approximately 90 degrees with respect to the approximate straight line UL, and calculates the second approximate straight line ULv (step S103).

Subsequently, the calculation unit 11 determines whether or not the second approximate straight line ULv calculated in step S103 has a length less than a predetermined prescribed length (step S104).

When the determination in step S104 is YES (step S104: YES), the calculation unit 11 calculates the virtual straight line VL connecting the end portion EP of the upper member UM and the approximate straight line LL of the lower member LM (step S105).

Subsequently, the detection unit 12 detects the intersection point WP of the virtual straight line VL and the approximate straight line LL of the lower member LM as a welding position and stores the detected intersection point in the memory (step S106). Then, this operation is ended.

Meanwhile, in the determination in step S104, when it is determined that the second approximate straight line ULv has a length which is not less than the predetermined prescribed length (step S104: NO), the calculation unit 11 detects the intersection point WP of the second approximate straight line ULv calculated in step S103 and the approximate straight line LL of the lower member LM calculated in step S101 as a welding position and stores the detected intersection point in the memory (step S107). Then, this operation is ended.

As described above, with the robot control device 1 of the embodiment, when the second approximate straight line ULv has a length less than the prescribed length, the virtual straight line VL is calculated, whereas when the second approximate straight line ULv has a length equal to or larger than the prescribed length, the welding position can be detected using the second approximate straight line ULv without calculating the virtual straight line VL. As a result, at a tacking site where the second approximate straight line can have a length less than the prescribed length, the intersection point can be detected by the calculated virtual straight line VL, and outside the tacking site where the second approximate straight line can have a length equal to or larger than the prescribed length, the intersection point can be detected by the highly accurate second approximate straight line calculated by using the laser sensor.

Therefore, according to the robot control device 1 of the embodiment, the detection accuracy of the welding position can be improved.

The above-described embodiments are for facilitating understanding of the present invention and are not intended to limit the present invention. The elements, arrangement, material, conditions, shape, size, and the like of the embodiments are not limited to those exemplified and can be appropriately changed.

For example, the robot control device 1 according to the above-described embodiment may further include an estimation unit that estimates the welding position by calculating the present intersection point on the basis of a plurality of intersection points heretofore detected by the detection unit 12. For example, the estimation unit sets the present intersection point on a straight line calculated by using a plurality of intersection points. Here, when the end portion of one member is buried by tacking performed by fillet welding, when the end portion is melted by heat, or the like, it is assumed that the end portion is not located within a range where the laser sensor detects the end portion and the end portion cannot be calculated. In such a case, the detection unit 12 cannot calculate the intersection point correctly.

However, as a result of including the estimation unit, when the end portion of one member is not calculated within a predetermined end portion detection range, for example, within the range where the laser sensor detects the end portion, the present intersection point can be calculated on the basis of the intersection points detected in the past and the welding position can be estimated. As a result, an error of the intersection point caused by the positional displacement of the end portion calculated, for example, when the end portion is buried by tacking, when the end portion is melted, or the like can be prevented from being reflected in the welding position.

Further, in the robot control device 1 according to the above-described embodiment, the second approximate straight line ULv is calculated, and when the second approximate straight line ULv has a length less than the prescribed length, the virtual straight line VL is calculated, but such a procedure is not limiting. For example, the virtual straight line VL may be calculated every time, without calculating the second approximate straight line ULv, and the welding position may be detected by the virtual straight line VL. Thus, even when the two approximate straight lines do not intersect each other, it is possible to detect the intersection point WP of the virtual straight line VL extending from the end portion EP of the upper member UM and the approximate straight line LL of the lower member LM as the welding position. Therefore, it is possible to detect the welding position suitable for the objects to be joined.

What is claimed is:

1. A welding position detection device comprising:
   a calculation unit; and
   a detection unit;
   wherein the calculation unit irradiates two members to be joined with laser light to calculate approximate straight lines of the respective members;
   the calculation unit calculates an end portion of one member of the two members on the basis of the approximate straight line of the one member;
   the calculation unit calculates a virtual straight line which is a straight line connecting the calculated end portion of the one member and the approximate straight line of the other member of the two members and having a specific angle with respect to the approximate straight line of the one member;
   the calculation unit radiates laser light from the end portion of the one member toward the other member side in a direction forming a specific angle with the approximate straight line of the one member and calculates a second approximate straight line in the one member, wherein the calculation unit further calculates the virtual line when the second approximate straight line has a length less than a predetermined prescribed length; and
   wherein the detection unit that detects an intersection point of the calculated virtual straight line and the approximate straight line of the other member as a welding position.

2. The welding position detection device according to claim 1, wherein
   the prescribed length is equal to or less than the thickness of the one member.

3. The welding position detection device according to claim 1, wherein when the second approximate straight line is not less than the predetermined prescribed length, the detection unit detects an intersection point of the second approximate straight line and the approximate straight line of the other member as a welding position.

4. The welding position detection device according to claim 1, further comprising
   an estimation unit that, when the calculation unit does not calculate the end portion of one member within a predetermined end portion detection range, estimates a welding position by calculating a present intersection point on the basis of a plurality of intersection points detected by the detection unit in a previous detection cycle and thereby instead of detecting the intersection point by the detection unit.

5. The welding position detection device according to claim 1, wherein
   the two members are welded by a lap joint.

6. The welding position detection device according to claim 5, wherein
   a part of the lap joint is tacked by fillet welding.

7. The welding position detection device according to claim 1, wherein
   the specific angle is substantially a right angle.

8. A welding position detection method controlled by a processor, the method comprising:
   irradiating two members to be joined with laser light and calculating approximate straight lines of the respective members;
   calculating an end portion of one member of the two members on the basis of the approximate straight line of the one member;
   calculating a virtual straight line which is a straight line connecting the calculated end portion of the one member and the approximate straight line of the other member of the two members and having a specific angle with respect to the approximate straight line of the one member;

detecting an intersection point of the calculated virtual straight line and the approximate straight line of the other member as a welding position; and radiating laser light from the end portion of the one member toward the other member side in a direction forming a specific angle with the approximate straight line of the one member and calculates a second approximate straight line in the one member, wherein calculating the virtual line when the second approximate straight line has a length less than a predetermined prescribed length.

9. A welding robot system comprising:

a welding robot that performs welding; and a welding position detection device, including a calculation unit that irradiates two members to be joined with laser light to calculate approximate straight lines of the respective members;

the calculation unit calculates an end portion of one member of the two members on the basis of the approximate straight line of the one member;

the calculation unit calculates a virtual straight line which is a straight line connecting the calculated end portion of the one member and the approximate straight line of the other member of the two members and having a specific angle with respect to the approximate straight line of the one member;

the calculation unit radiates laser light from the end portion of the one member toward the other member side in a direction forming a specific angle with the approximate straight line of the one member and calculates a second approximate straight line in the one member, wherein the calculation unit calculates the virtual line when the second approximate straight line has a length less than a predetermined prescribed length; and a detection unit that detects an intersection point of the calculated virtual straight line and the approximate straight line of the other member as a welding position.

* * * * *